United States Patent [19]
Patton

[11] 3,979,891
[45] Sept. 14, 1976

[54] PNEUMATIC FRUIT HARVESTER

[76] Inventor: Orvil D. Patton, 1114 Jefferson Ave., Yakima, Wash. 98902

[22] Filed: Mar. 7, 1975

[21] Appl. No.: 556,263

[52] U.S. Cl. ............................................. 56/328 R
[51] Int. Cl.² ........................................ A01D 46/00
[58] Field of Search ............ 56/328 R, 328 TS, 329, 56/12.8–13.3

[56] References Cited
UNITED STATES PATENTS

| | | | |
|---|---|---|---|
| 2,976,576 | 3/1961 | Wichterle et al. | 260/89.5 R |
| 2,996,868 | 8/1961 | Voelker | 56/328 R |
| 3,114,998 | 12/1963 | Weisser | 56/328 R |
| 3,218,305 | 11/1965 | Krieble | 260/86.1 R |
| 3,220,960 | 11/1965 | Wichterle | 260/86.1 R |
| 3,351,061 | 11/1967 | Nolan | 128/283 |
| 3,361,858 | 1/1968 | Wichterle | 264/1 |
| 3,496,705 | 2/1970 | Perrelli | 56/1 |
| 3,515,579 | 6/1970 | Shepherd et al. | 260/86.1 R |
| 3,584,442 | 6/1971 | White | 56/328 R |
| 3,640,741 | 2/1972 | Etes | 128/283 |
| 3,647,736 | 3/1972 | Ewell | 260/29.6 WB |
| 3,700,761 | 10/1972 | O'Driscoll et al. | 260/29.6 WB |
| 3,712,304 | 1/1973 | Marsan | 128/283 |
| 3,721,657 | 3/1973 | Siderman | 260/29.6 WB |

*Primary Examiner*—Russell R. Kinsey
*Attorney, Agent, or Firm*—Seed, Berry, Vernon & Baynham

[57] ABSTRACT

An apparatus and method for harvesting fruit from a fruit tree. The tree is enclosed by a tubular shroud having an open top and bottom. A fruit catcher is suspended beneath the shroud, and a rotatably powered propeller horizontally mounted in the shroud above the tree draws air entering at the bottom upwardly through the shroud and out the top. The updraft of air shakes the fruit from the branches and reduces the falling velocity of the fruit in order to prevent the fruit from being bruised upon striking a fruit catcher positioned beneath the branches of the tree. Associated with the catcher is a conveyor for transporting the fruit from beneath the shroud to a point adjacent the harvester.

16 Claims, 8 Drawing Figures

PNEUMATIC FRUIT HARVESTER

BACKGROUND OF THE INVENTION

1. Field of the Invention

This invention relates to the harvesting of fruit from trees and, more particularly, to an apparatus and method for harvesting fruit from trees by directing an updraft of air through the trees, thereby shaking the fruit from the branches and slowing the falling velocity of the fruit.

2. Description of the Prior Art

A substantial factor in the high cost of fruit is the expense of harvesting the fruit from the tree. In most cases, the fruit is harvested from the tree by hand. Since a worker is able to harvest relatively few trees each day, the fruit harvested in this manner is relatively expensive. Furthermore, the fruit must be picked when it is ripe, and the fruit trees in a given area of the country usually ripen at about the same time. Thus, the demand for fruit pickers drastically increases during harvesttime.

Many attempts have been made to mechanize the harvesting of fruit in order to increase the productivity of the workers. These mechanized harvesters generally fall into a number of distinct categories. The first category includes devices for lifting the worker into the tree to make the fruit more accessible and to allow the worker to pick more fruit in a given period of time. Another type of mechanized fruit harvester is the tree shaker. These devices generally grasp the trunk of the tree near its base and shake or vibrate the tree, thereby shaking the fruit from the branches. Another type of device utilizes a vacuum hose to collect the fruit by sequentially placing the end of the hose adjacent each individual item of fruit. Another category directs a high-speed stream of air into the tree to blow the fruit from the branches. Although these devices are relatively effective in removing the fruit from the tree, most of them do not prevent the fruit from being damaged upon falling. Further, after being shaken from the tree, the fruit will be scattered about a wide area, requiring a great deal of labor to collect the fruit in one location. Fruit harvesters which are able to overcome these problems do not remove the fruit from the tree at substantially the same time.

SUMMARY OF THE INVENTION

It is an object of the invention to provide an apparatus and method for simultaneously removing substantially all of the fruit from a fruit tree.

It is another object of the invention to harvest the fruit without causing damage to the fruit or, in any way, effecting the quality of the fruit.

It is a further object of the invention to automatically collect the fruit in one central location after harvesting.

It is still another object of the invention to provide an apparatus of the type described which can be operated by a single workman, thereby drastically decreasing the labor costs associated with the harvesting of fruit.

These and other objects of the present invention are accomplished by directing airflow upwardly through the branches of a fruit tree. The updraft of air shakes the branches, thereby shaking the fruit from the tree. The updraft further slows the falling velocity of the fruit to insure that it is not damaged upon striking a fruit catcher positioned beneath the branches of the tree. In one embodiment of the invention, a tubular shroud having an open top and bottom encloses the fruit tree. A fruit catcher is positioned at the bottom of the shroud and is adapted to cushion the fall of the fruit. The fruit is then received by a conveyor which transports the fruit to a central location. A propeller or fan rotatably driven by a suitable power source is horizontally mounted in the shroud above the tree. The fan draws air from inside the shroud, thereby creating a partial vacuum which draws air into the shroud through its open bottom. The updraft of air thereby created shakes the branches and separates the fruit from the tree. The separated fruit falls onto the fruit catchers below. However, the fan has sufficient air removing capacity to create an updraft capable of reducing the falling speed of the fruit. Since the fruit strikes the fruit catchers at a relatively lower velocity, the fruit is not bruised or otherwise damaged.

The shroud, fan and fruit catchers are supported by a frame which straddles the tree. The frame includes four legs, each having a wheel at its lower end contacting the ground. A plurality of trees are harvested by raising the shroud and pulling the harvester from one tree to the next. The shroud is then lowered to enclose the next tree. Means are also provided for folding the harvester into a relatively compact unit for facilitating transport of the harvester along public roads.

DETAILED DESCRIPTION OF THE INVENTION

Figures 1, 2:
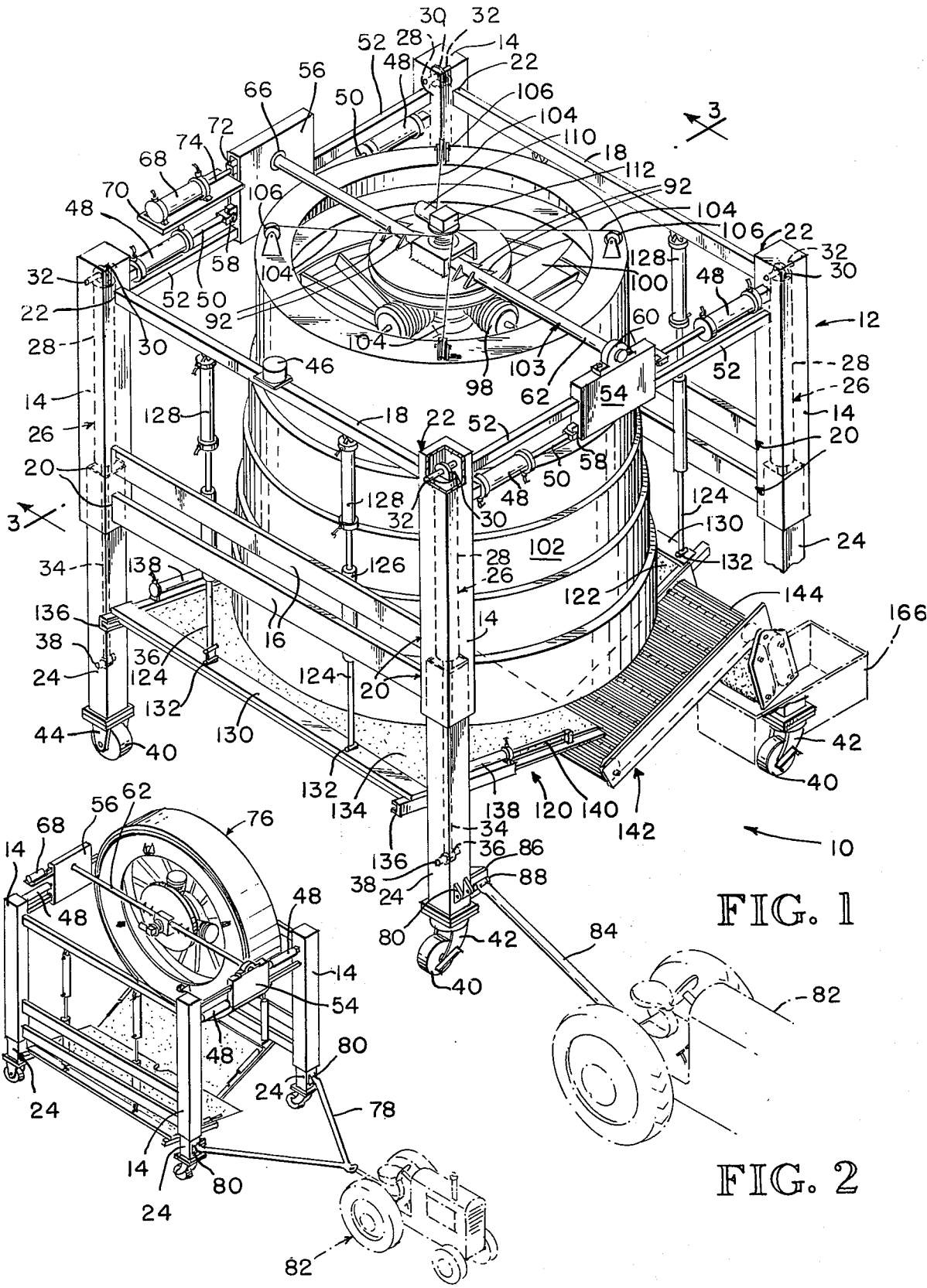
FIG. 1 is an isometric view of the pneumatic fruit harvester shown in the fruit harvesting position.
FIG. 2 is an isometric view showing the harvester in its compact configuration to faciliate transportion on public roads.

The pneumatic fruit harvester 10, as shown in FIG. 1, includes a frame 12 having four rectangular upper legs 14 separated from each other on both sides by lower braces 16 and an upper brace 18. The braces 16, 18 are secured to the upper legs 14 by welding at 20 and 22. The upper legs 14 are hollow and receive lower legs 24, which have an outside dimension slightly smaller than the inside dimension of the upper legs 14. The lower legs 24 are supported inside the upper legs 14 by hydraulic actuators 26 which are used to adjust the height of the fruit harvester to conform to the height of the tree being harvested. The actuators 26 are independently adjustable to maintain the harvester substantially level when used on uneven terrain. Each actuator 26 includes a hydraulic cylinder 28 having an eye 30 at its uppermost end through which a shaft 32 is inserted. The ends of the shafts 32 are suitably secured to the walls of the upper legs 14. An actuating rod 34, secured to a piston (not shown) inside each cylinder 28, terminates in an eye 36 through which shaft 38 passes. The shafts 38 are welded at each end to the inside surface of the lower legs 24. The actuators 26 are powered by an external source of pressurized hydraulic fluid (not shown), including suitable flow controls. A wheel 40 is secured to the end of each lower leg 24. Each of the wheels 40 is rotatably mounted in a wheel frame. The wheel frame 42, supporting three of the lower legs 24, pivots or swivels to align the wheels 40 in any direction. However, the wheel frame 44 is rigidly secured to the lower leg 24, thereby fixedly aligning the wheel as shown in FIG. 1. The wheel frames 42, 44 may include suitable resilient means for absorbing bumps and for maintaining all four wheels on the ground when traversing irregular areas.

an automatic leveler 46, to be described in detail hereinafter, is secured to the top surface of one of the upper braces 18. The automatic leveler 46 detects an angular inclination of the frame 12 and signals the hydraulic control system (not shown) to adjust the proper hydraulic actuator 26 to level the frame 12.

Figures 4, 5:
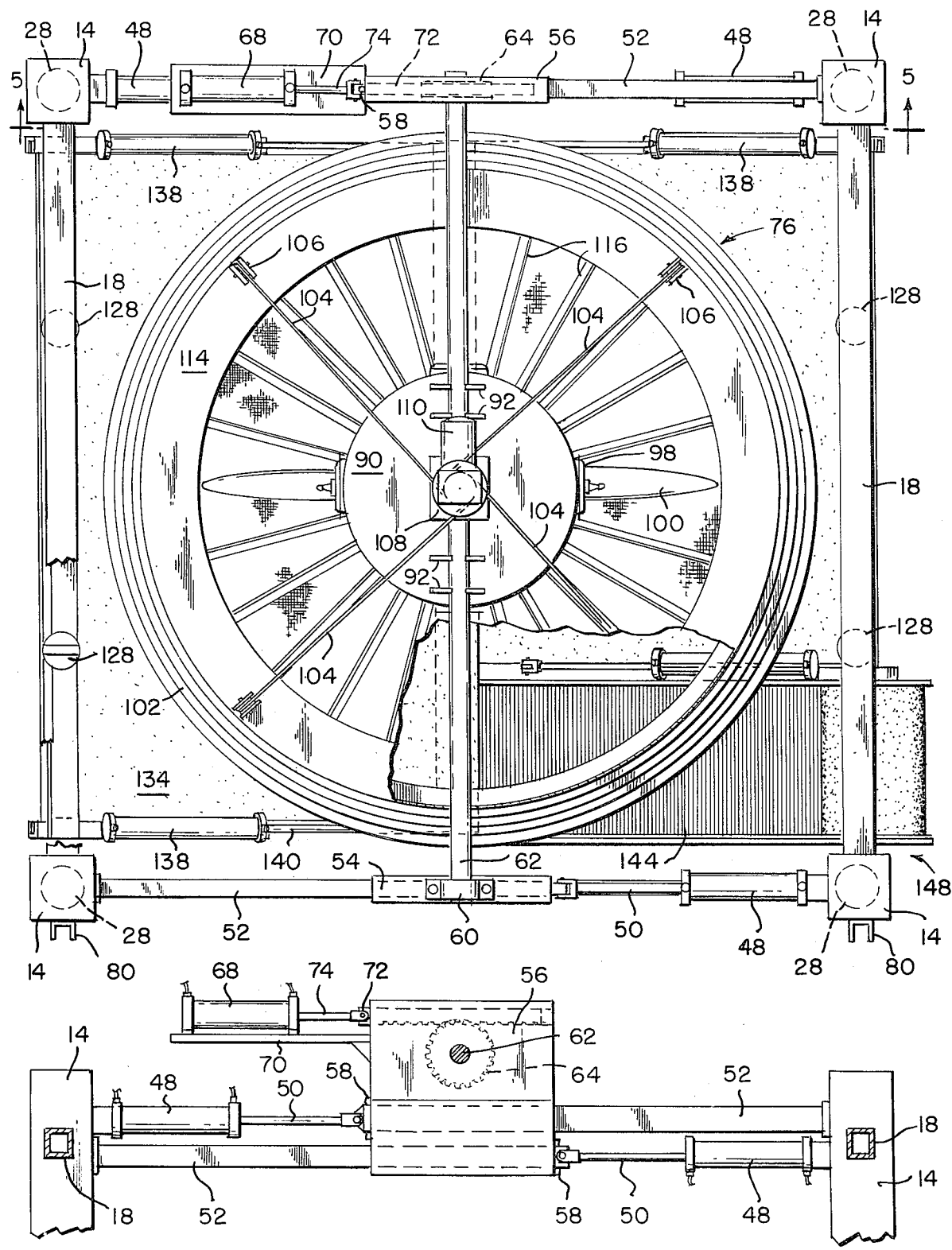
FIG. 4 is a top plan view of the pneumatic fruit harvester.
FIG. 5 is a side plan view showing the mechanism for rotating the housing containing the fan and shroud into a vertical plane.

The upper legs 14 on either side of the harvester 10 are connected to each other through hydraulic cylinders 48 for compacting the harvester to the configuration shown in FIG. 2. A rod 50, which is secured to a piston inside the cylinder 48, extends inwardly and is secured to an elongated member 52. The elongated members 52 slidingly engage a pair of mounting plates 54, 56. A pin or stop 58 (see also FIG. 5) is secured to each elongated member 52 adjacent the actuating rod 50 to prevent the mounting plates 54, 56 from sliding along the member 52 when the harvester is in its operating position, as shown in FIG. 1. However, the members 52 can slide through the mounting plates 54, 56 to draw the frame together as shown in FIG. 2. The mounting plate 54 carries a cylindrical bearing 60 adapted to receive a shaft 62. The opposite end of the shaft 62 is secured to a pinion gear 64, as best shown in FIG. 5. The pinion gear 64 and shaft 62 are supported by journals 66 integrally formed in the mounting plate 56. A hydraulic actuator 68, rigidly mounted to a support plate 70, which is secured to the mounting plate 56, drives a rack 72 through an actuating rod 74. The rack 72 is slidably mounted in the mounting plate 56 and is adapted to mesh with the pinion gear 64. Thus, linear movement of the rack 72, produced by the hydraulic actuator 68, rotates the pinion gear 64 as well as the shaft 62 secured thereto. As explained in detail hereinafter the shaft 62 supports a housing 76 (FIG. 2) containing a shroud and fan. When the fruit harvester 10 is to be moved from one place to another, the shaft 62 is rotated, thereby placing the housing 76 in a vertical plane, as shown in FIG. 2. Hydraulic cylinders 48 are then actuated to draw the frame 12 on either side of the housing 76 together. Finally, a drawbar 78 is secured to ears 80 on the forward lower legs 24.

When the fruit harvester 10 is to be moved short distances, such as from one tree to another, the frame remains in its open position. Under these circumstances, the harvester is towed by a drawbar 84 secured to the tractor 82. The drawbar 84 is connected to a mounting plate 86 welded to the lower leg 24 by a hinge 88. The hinge 88 allows vertical rotation of the drawbar 84 but fixes the angular position of the drawbar 84 with respect to the leg 24 along a horizontal plane. Thus, when the harvester is towed behind a tractor, the harvester will not tend to move laterally, transverse to the direction of travel.

Figure 3:
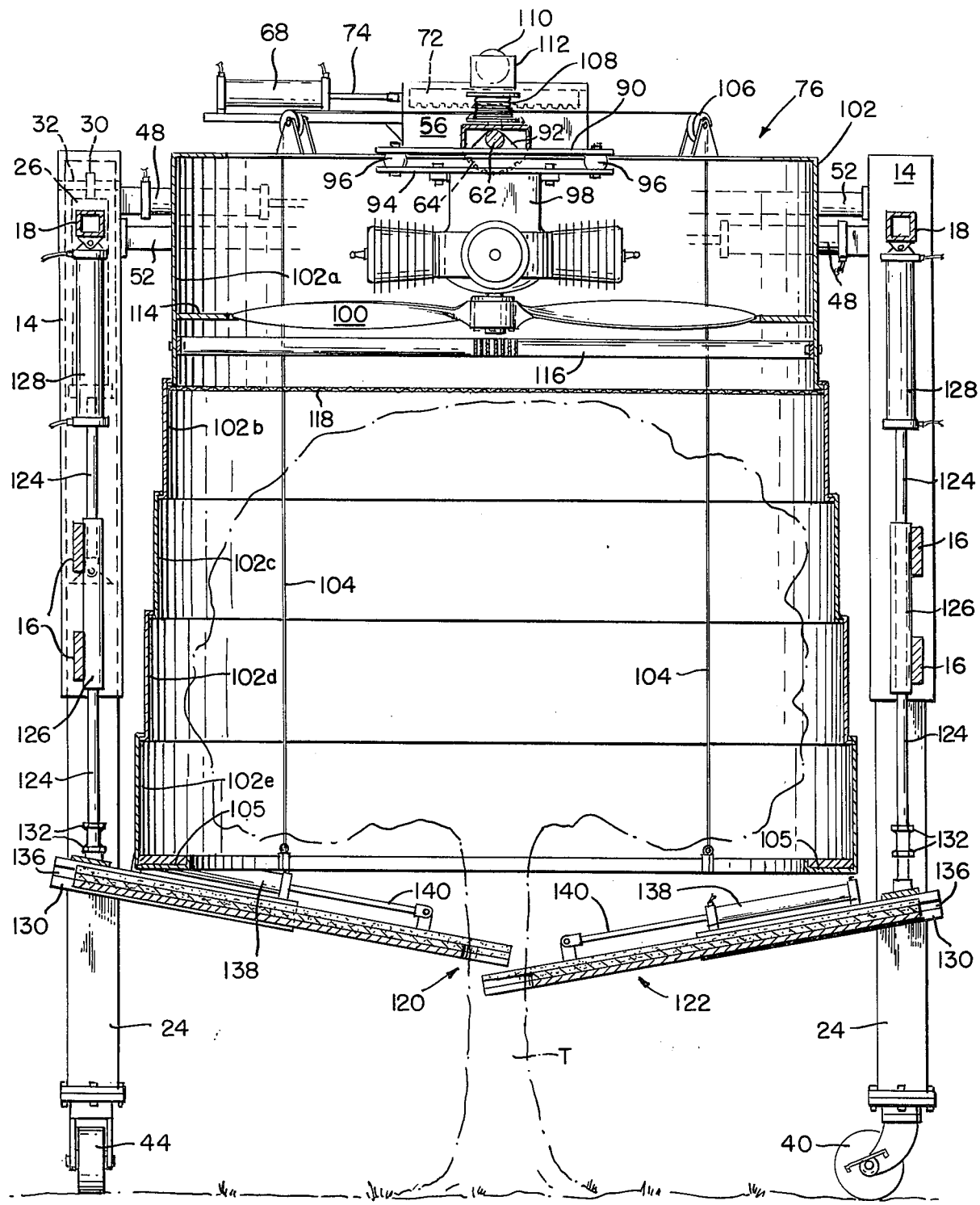
FIG. 3 is a cross-sectional view taken along the line 3—3 of FIG. 1 showing the shroud enclosing a fruit tree and the harvester in operation.

Referring now also to FIGS. 3 and 4, the shaft 62 is fastened to an annular plate 90 by gussets 92 secured to the shaft 62 and mounting plate 90 by welding. A second mounting plate 94 is suspended beneath the plate 90 by resilient, shock-absorbing means 96. A powered source of rotary motion 98, such as an airplane engine, is bolted to the mounting plate 94. The shock absorbers 96 isolate the vibration produced by the engine 98 from the remaining elements of the fruit harvester 10. The engine 98 rotates a propeller or fan 100 in a direction such that air is drawn upward. The shaft 62 is welded to a shroud 102 and 103. As best seen in FIG. 3, the shroud 102 comprises a number of cylindrical sections 102a, b, c, d, e of increasing diameter. The top edges of sections 102b, c, d, e form an inwardly extending flange and the bottom edges of sections 102a, b, c, d form an outwardly extending flange. Each of these sections is supported at its inwardly extending flange by the outwardly extending flange of the smaller diameter section above. Four cables 104 are secured to the bottom section 102e after engaging pulleys 106 rotatably secured to the top of the upper section. The cables 104 are wrapped around a common spool 108. The spool 108 is rotated by a motor 110 through a gear box 112. The gear box 112 contains a solenoid of conventional variety for preventing rotation of the spool 108 when the motor is not energized. However, energization of the motor 110 disengages the braking mechanism inside the gear box 112, allowing the spool 108 to rotate. Energization of the motor 110 winds cable 104 onto the spool 108 in one direction and unwinds cable 104 in the other direction. Since the cables 104 are secured to the lower section of the shroud 102e, the lower shroud 102e is lifted when the cables 104 are wound onto the spool 108. Subsequently, the inwardly extending flange 105 on the bottom edge of section 102e contacts the bottom edge of section 102d and lifts the section upward. Ultimately, the lower surfaces of all of the sections rest upon flange 105 and the shroud 102 is in the configuration shown in FIG. 2. In this position, the actuators 26 in each of the upper legs 14 are adjusted so that the lower edge of the shroud 102 clears the top of all trees to be harvested with the machine.

Referring now to FIGS. 3 and 4, an open-centered, annular plate 114 is secured to the inside surface of the upper section 102a of the shroud adjacent the fan 100. The plate 114 prevents air from entering the shroud through the top. Similarly, the mounting plate 90 prevents air from flowing into the shroud 102 at the center of the fan 100. A baffle 116, comprising a plurality of planar members, is positioned beneath the fan 100. The planar members are spaced apart from each other and positioned in a vertical plane. The baffle 116 prevents a circular airflow from occuring inside the shroud 102. Thus, when the fan 100 is drawing air from the shroud 102 at the top, air enters the shroud at its bottom and flows directly upward. Beneath the baffle 116, a screen 118 covers the bottom of the upper section 102a. The screen 118 prevents the upwardly flowing air from carrying objects into the rotating fan 100.

A pair of fruit catchers 120, 122 are positioned beneath the shroud 102. The catchers 120, 122 are supported beneath the shroud 102 by actuating rods passing through sleeves 126 secured to the braces 16. The actuating rods 124 are driven by a hydraulic actuator 128 and are pivotally secured at 132 to a catcher frame 130 which allow the inclination of the catchers 120, 122 to be adjusted from front to back while maintaining the side-to-side inclination of the catchers 120, 122 constant. In normal operation, the rear ends of the catchers 120, 122 are elevated higher than the front ends of the catchers 120, 122. Thus, fruit falling onto the catchers rolls forwardly. Sheets of resilient material 134 are slidably supported by grooves 136 in the catcher frames 130. The position of the sheets 134 with respect to the frames 130 is adjusted by hydraulic actuators 138 fastened to the frames 130. An actuating rod 140, extending from the actuator 138, is secured to the sheet 134. Each of the resilient sheets 134 contains a semicircular cutout (not shown) at the center of its inner edge to fit around the trunk T of the fruit tree. In this position, the upper sheet overlaps the lower sheet. In operation, the height of the catchers 120, 122 is adjusted by actuators 128 so that the catchers 120, 122 are inclined downwardly, from back to front. When the fruit harvester 10 is placed in its compact position, as shown in FIG. 2, the catcher 120 is raised substantially higher than the catcher 122 so that the catchers can completely overlap each other. The actuators 138 also draw the sheets 134 inwardly. If desired, the sheets 134 may be air-permeable to facilitate airflow into the shroud 102.

Figure 6:
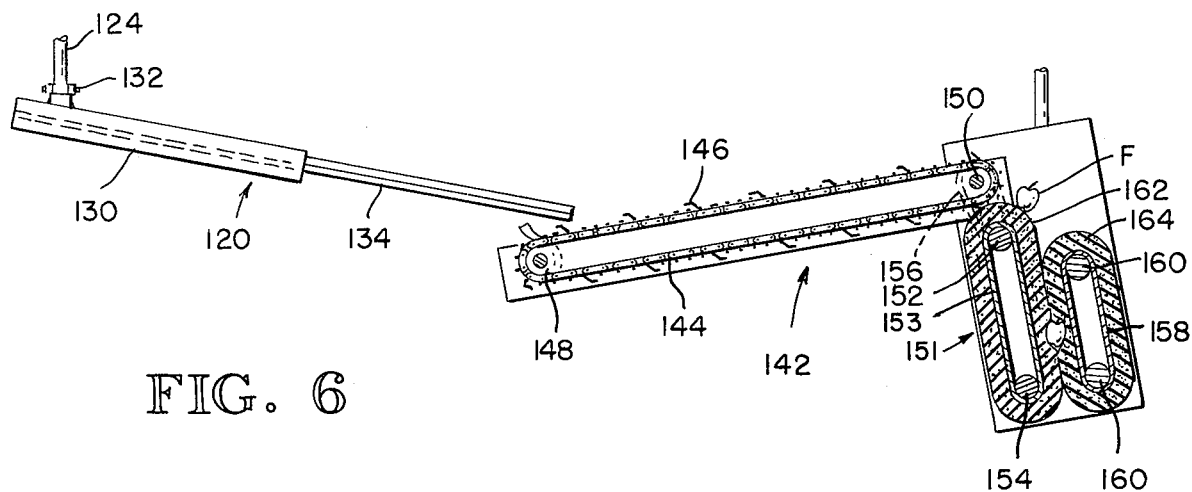
FIG. 6 is a side plan view illustrating the conveyor used to remove the fruit from the fruit catchers and transport it to a receiving bin.

As the fruit rolls forward along the resilient sheets 134, it is carried way by conveyor assembly 142. As best seen in FIG. 6, the conveyor assembly 142 includes a continuous belt 144 having a plurality of outwardly extending cleats 146 on its surface. The belt 44 engages a rotatably mounted roller 148 at its inner end and a rotatably powered wheel 150 at its outer end. Fruit is placed onto the belt 144 between the cleats 146 and carried outwardly from beneath the shroud. At the other end of the conveyor, the cleats 146 support and lower the fruit F to a second conveyor 151. The second conveyor assembly 151 comprises a continuous belt 153 engaging two rotatably mounted rollers 152, 154. The upper roller 152 is driven by roller 150 through a drive belt 156. A similar belt 158 is rotatably supported by rollers 160 adacent the belt 153. Both belts 153, 158 are coated with a resilient material 162, 164. Fruit F falling between the belts 153, 158 compresses the resilient material 162, 164 as the belts 153, 158 carry the fruit downward into the receiving bin 166 (FIG 1). Suitable means are provided (not shown) for adjusting the inclination of the assembly 151 so that fruit leaving the assembly 151 falls only a short distance into the receiving bin 166. The conveying assemblies 142 151 thus remove the fruit from the catchers 120, 122 without bruising or otherwise damaging the fruit.

Figure 7:
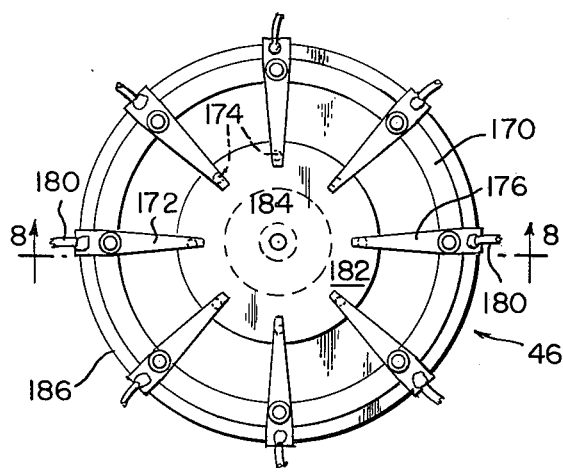
FIG. 7 is a top plan view showing a level sensor utilized in connection with the fruit harvester.
Figure 8:
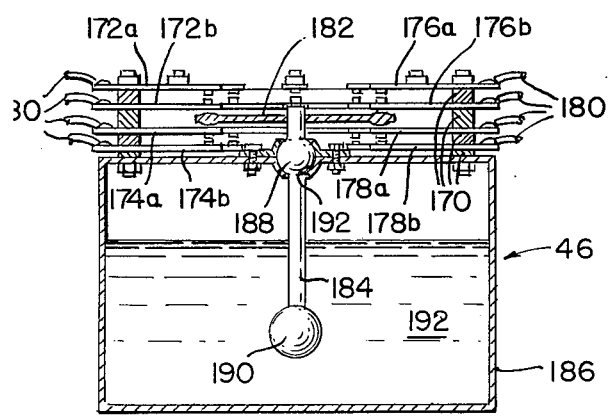
FIG. 8 is a side cross-sectional view of the level sensor taken along the line 8—8 of FIG. 7.

The level sensor 46, mounted to the top brace 18, is shown in FIGS. 7 and 8. The level sensor 46 includes a plurality of annular insulators 170. The insulators 170 have secured thereto a plurality of equally spaced conductors, shown in FIG. 8 as 172a, b, 174a, b, 176a, b, 178a, b, each containing opposed contacts. The outer end of each conductor is connected to a wire 180. The annular insulator 170 surrounds a disc of electrically non-conductive material 182 supported by a shaft 184. The shaft 184 extends into a tank 186 and is supported at the top of the tank by a spherical bearing 188 integrally formed in the shaft. The end of the shaft 184 terminates in a weighted sphere 190. The bearing 188 and bearing surfces 192, carried by the top of the tank 186, allow a shaft inclination of any angle. Thus, as the tank 186 is tipped, the weight 190 will point the shaft 184 downward, tilting the disc 182. As the disc 182 tilts, it deflects conductors on either side of the disc. Thus, if the tank as shown in FIG. 8 is tilted clockwise, the disc 182 will depress conductor 174a downward to contact conductor 174b, and conductor 176b upward to contact conductor 176a. The tank 186 is partially filled with oil 192 to dampen the movement of the shaft 184 to prevent the weight 190 from oscillating. The wires 180, connected to the conductors, are connected to a hydraulic actuator (not shown) for adjusting the relative position between the upper legs 14 and lower legs 24.

In operation, the fruit harvester 10 is towed to the orchard in its compact configuration, as shown in FIG. 2. The drawbar 78 is removed from the forward legs 14, hydraulic actuators 48 are energized, thereby opening the frame to the configuration shown in FIG. 1, and hydraulic actuator 68 is energized to rotate the shaft 62, thereby placing the housing 76 in a horizontal plane. The catchers 120, 122 are then lowered, the upper legs 14 are raised, and the drawbar 84 is connected to the tractor 82. The tractor then positions the harvester over a fruit tree, and the shroud 102 is lowered by energizing the motor 110. When the engine 98 is started, the fan 100 creates a partial vacuum inside the shroud 102 by drawing air from the shroud 102 at its open top. The partial vacuum draws air inwardly at the bottom of the shroud 102, creating a strong updraft through the shroud. The updraft vibrates the branches of the tree, shaking the fruit loose and allowing it to drop onto the catchers 120, 122 below. The updraft is sufficiently strong to slow the falling velocity of the fruit, preventing the fruit from being damaged upon striking the catchers 120, 122. Since the catchers 120, 122 are inclined downwardly from back to front, the fruit, after falling onto the catchers, rolls toward the front of the harvester and onto the conveyor 144. The conveyor 144 transports the fruit F to the conveyor assembly 148, which gently drops the fruit into the receiving bin 166. After the fruit from one tree has been harvested, the shroud 102 is raised by energizing the motor 110 and the harvester 10 is towed to the next fruit tree in line. When all of the trees in an orchard have been harvested, the shroud 102 is raised, hydraulic actuator 68 rotates shaft 62 to place the shroud 102 in a vertical plane, the catchers 120, 140 are raised, the resilient sheet 134 is pulled outwardly by actuator 138, hydraulic actuators 48 draw the legs 14, 24 on opposite sides of the harvester together, and the drawbar 178 is connected to the ears 80 and the tractor 82. The harvester 10 is then towed to a new location.

The embodiments of the invention in which a particular property or privilege is claimed are defined as follows:

1. An apparatus for harvesting fruit from a tree, comprising:
    a shroud enclosing the tree, said shroud having inlet means allowing air to enter said shroud beneath the branches of the tree;
    a fruit catcher operatively associated with said shroud and positioned therebeneath so as to be disposed beneath the branches of the tree; and
    powered means operatively associated with said shroud for removing air from said shroud above the tree, said powered means having sufficient air removing capacity to create an updraft in said shroud capable of shaking fruit loose from the tree.

2. The apparatus of claim 1 wherein said powered means has sufficient air removing capacity to materially reduce the falling speed of the fruit shaken loose from the tree.

3. The apparatus of claim 1 wherein said shroud means comprises a plurality of concentric cylindrical shells of varying diameters, all of which are greater that the greatest diameter of the tree, said shells further including means for restraining axial movement between adjacent shells whereby each shell supports the shell below and wherein the lowermost shell is capable of raising the remaining shells.

4. The apparatus of claim 3, further including means for controlling the vertical position of said shells, comprising:
   a plurality of cables having one end secured to the lowermost shell;
   a spool upon which the other ends of said lines are wound; and
   means for selectively rotating said spool in either direction.

5. The apparatus of claim 1 wherein said shroud and said powered means are mounted on a longitudinal support shaft and wherein said support shaft and said catcher are secured to a frame, said frame including means for rotating said support shaft approximately 90°, thereby placing said shroud and powered means in a substantially vertical plane.

6. The apparatus of claim 5, further including means for moving the frames on either side of its longitudinal axis together.

7. The apparatus of claim 1 wherein said powered means for removing air from said shroud comprises:
   a fan blade rotatably mounted in said shroud above the tree, said fan blade being in a substantially horizontal plane; and
   means for rotating said fan blade.

8. The apparatus of claim 1 wherein said fruit catcher comprises a pair of inclined sheets of resilient materail suspended beneath said shroud with one of said sheets overlying the other.

9. The apparatus of claim 8 wherein the inner edge of said sheets contains a generally semicircular cutout adapted to encircle the trunk of the tree and wherein said catcher includes means for retracting said sheets away from each other to allow removal of the harvester from the tree.

10. The apparatus of claim 9 wherein said sheets are inclined toward one end, said catcher further including a first conveyor adjacent the lower end of said sheets whereby fruit falling on said sheets rolls onto said conveyor and is removed from beneath the tree.

11. The apparatus of claim 1 wherein said fruit catcher includes a first conveyor for removing fruit from beneath the branches of the tree and delivering it to a second conveyor, said second conveyor comprising a pair of substantially vertical, parallel conveyor belts positioned face-to-face at a distance apart from each other greater than the smallest dimension of the fruit, said belts being coated with a resilient material with a thickness of at least one-half the interbelt distance minus one-half the smallest dimension of the fruit whereby fruit positioned between the belts wil contact the resilient material coating each belt.

12. A method of harvesting fruit from a plurality of trees in an orchard, comprising:
   enclosing a tree in a substantially air-impervious shroud;
   removing air from said shroud above the tree;
   allowing air to enter said shroud beneath the tree, thereby creating an updraft through the tree for shaking fruit loose from the branches;
   catching the fruit falling from the tree and collecting it at a central location;
   removing said shroud from the tree;
   transporting said shroud to a position adjacent another tree; and
   repeating the aforementioned steps until all of the trees in said orchard have been harvested.

13. The method of claim 12 wherein said shroud comprises a plurality of concentric cylindrical shells of varying diameters and wherein said step of removing said shroud from the tree is accomplished by axially moving said shells upward.

14. The method of claim 12 wherein the lowermost of said shells includes a stop for restraining axial movement of the lowermost shell with respect to the remaining shells, and the step of moving said shells is accomplished by securing a plurality of lines to the lowermost shell, winding said lines on a common spool and selectively rotating said spool in either direction.

15. The method of claim 12 wherein air is removed from said shroud by rotating a fan blade within said shroud above the tree, said rotation being in a substantially horizontal plane.

16. The method of claim 15 wherein said shroud and said fan blade are mounted on a longitudinal support shaft secured to a frame and wherein said shroud, fan blade and frame are placed in a towing configuration by the method comprising:
   reducing the height of said frame;
   rotating said support shaft approximately 90°, thereby placing said shroud and fan blade in a substantially vertical plane;
   moving the frame on either side of the longitudinal axis together; and
   attaching a tow bar to one longitudinal end of said frame.

* * * * *